(12) United States Patent
Lin et al.

(10) Patent No.: US 12,210,914 B2
(45) Date of Patent: Jan. 28, 2025

(54) AUTOMATED GLOBALLY OPTIMIZED RESOURCE ALLOCATOR AND SCHEDULER

(71) Applicant: Sync Computing Corp., Cambridge, MA (US)

(72) Inventors: Erica Lin, Cambridge, MA (US); Luna Xu, Middle River, MD (US); Marco Montes de Oca, Ashland, MA (US); Suraj Bramhavar, Arlington, MA (US); Jeffrey Chou, Boston, MA (US)

(73) Assignee: Sync Computing Corp., Cambridge, MA (US)

( * ) Notice: Subject to any disclaimer, the term of this patent is extended or adjusted under 35 U.S.C. 154(b) by 0 days.

(21) Appl. No.: 18/102,578

(22) Filed: Jan. 27, 2023

(65) Prior Publication Data

US 2023/0244543 A1   Aug. 3, 2023

Related U.S. Application Data

(60) Provisional application No. 63/304,526, filed on Jan. 28, 2022.

(51) Int. Cl.
   *G06F 9/50*   (2006.01)

(52) U.S. Cl.
   CPC .......... *G06F 9/5077* (2013.01); *G06F 9/5072* (2013.01); *G06F 2209/501* (2013.01); *G06F 2209/503* (2013.01); *G06F 2209/506* (2013.01)

(58) Field of Classification Search
   CPC ................ G06F 9/5077; G06F 9/5072; G06F 2209/501; G06F 2209/503; G06F 2209/506
   See application file for complete search history.

(56) References Cited

U.S. PATENT DOCUMENTS

| | | | |
|---|---|---|---|
| 10,514,949 B1 * | 12/2019 | Korda | G06F 9/5072 |
| 2021/0073114 A1 * | 3/2021 | Haubold | G06F 9/5011 |
| 2023/0023333 A1 * | 1/2023 | Naveh | G06F 3/016 |

OTHER PUBLICATIONS

Hilman et al. "Multiple Workflows Scheduling in Multi-tenant Distributed Systems: A Taxonomy and Future Directions" May 22, 2019 (Year: 2019).*
Lin et al. "Global Optimization of Data Pipelines in Heterogeneous Cloud Environments," Feb. 11, 2022 (Year: 2022).*
Tumanov et al., TetriSched: Global Rescheduling with Adaptive Plan-Ahead in Dynamic Heterogeneous Clusters, EuroSys '16, Apr. 18-21, 2016.

* cited by examiner

*Primary Examiner* — Sisley N Kim
(74) *Attorney, Agent, or Firm* — Van Pelt, Yi & James LLP

(57) ABSTRACT

A method of efficiently executing a plurality of processes is described. The method generates, using a predictor, operating constraints for the processes. An operating constraint of the operating constraints is for each process of the processes. The method evaluates possible operating points for each process consistent with the operating constraints and according to a cost function for the processes. The method also determines an operating point for each process based on the evaluating.

13 Claims, 5 Drawing Sheets

AUTOMATED GLOBALLY OPTIMIZED RESOURCE ALLOCATOR AND SCHEDULER

CROSS REFERENCE TO OTHER APPLICATIONS

This application claims priority to U.S. Provisional Patent Application No. 63/304,526 entitled AUTOMATED GLOBALLY OPTIMIZED RESOURCE ALLOCATOR AND SCHEDULER filed Jan. 28, 2022 which is incorporated herein by reference for all purposes.

BACKGROUND OF THE INVENTION

Cloud computing environments are attractive for use for a variety of workflows. For example, machine learning and production data processing may be desired to be performed in such environments. Cloud computing environments offer a wide range of choices with respect to the resources available and the corresponding prices for the resources used for a workflow. The performance (e.g., the runtime for a particular task or the total runtime for a set of tasks) depends upon the resources allocated to the workflow and the scheduling of tasks in the workflow. Thus, cloud computing environments can provide flexibility for different cost-performance needs. However, this flexibility of cloud environments also leads to significant complexity in selecting the resource configuration (e.g., virtual machine instance type and resource demands) for each task in a cloud computing workflow and scheduling the tasks with the selected resources. In particular, poor (or sub-optimal) selection of resources and/or scheduling of tasks may result in long run times and/or significant costs incurred for the resources used. Thus, both longer run times and larger costs may be significant issues for users of a cloud computing infrastructure. Further, resource allocation and scheduling using conventional techniques may be poor and/or may take a significant amount of time to perform. Accordingly, an improved mechanism for provisioning resources and scheduling workflows for cloud computing environments is desired.

BRIEF DESCRIPTION OF THE DRAWINGS

Various embodiments of the invention are disclosed in the following detailed description and the accompanying drawings.

DETAILED DESCRIPTION

Figure 1A:
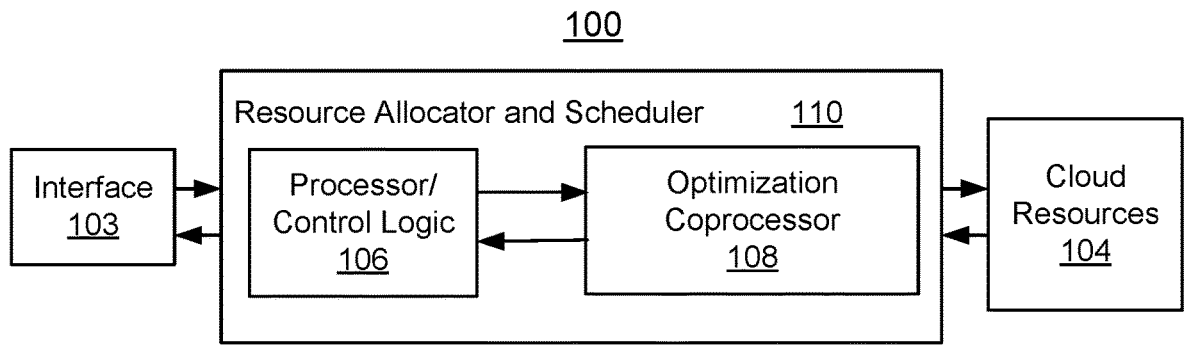
FIGS. 1A-1B depict an embodiment of a computing system architecture for performing resource allocation and scheduling for cloud computing.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A method and computer program product embodied in a non-transitory computer readable medium and comprising computer instructions for efficiently executing a plurality of processes are described. Using a predictor, a plurality of operating constraints for the plurality of processes is generated. An operating constraint of the plurality of operating constraints is for each process of the plurality of processes. A plurality of possible operating points for each process consistent with the plurality of operating constraints and according to a cost function for the plurality of processes is evaluated. An operating point is determined for each process based on the evaluating.

A system for efficiently executing a plurality of processes is also described. The system includes a processor and a memory coupled to the processor and configured to provide the processor with instructions. As used herein, a processor may include multiple processors (e.g. including multiple cores) and/or a memory may include multiple memories and types or storage. The processor is configured to generate, using a predictor, operating constraints for the processes. An operating constraint is for each of the processes. The processor is also configured to evaluate possible operating points for each process consistent with the operating constraints and according to a cost function for the processes. The processor is also configured to determine an operating point for each process based on the evaluation.

In some embodiments, the operating constraint for a process includes a runtime for the process versus a portion of available computing resources utilized for the process. The operating point for each process determines an order of the plurality of processes, an optimized makespan, and an optimized computing resources used for executing the plurality of processes. The operating point for the process may include a particular runtime and particular computing resources used for the runtime consistent with the operating constraint for the process. The operating point may also include an order of each process in the plurality of processes. The cost function may include computing resources utilized for the plurality processes versus a makespan for the plurality of processes. In some embodiments, the cost function includes a user-weighted combination of the computing resources utilized for the plurality of processes and the makespan for the plurality of processes. In some embodiments, evaluating the possible operating points includes searching a space including the possible operating points for each process.

Figure 1B:
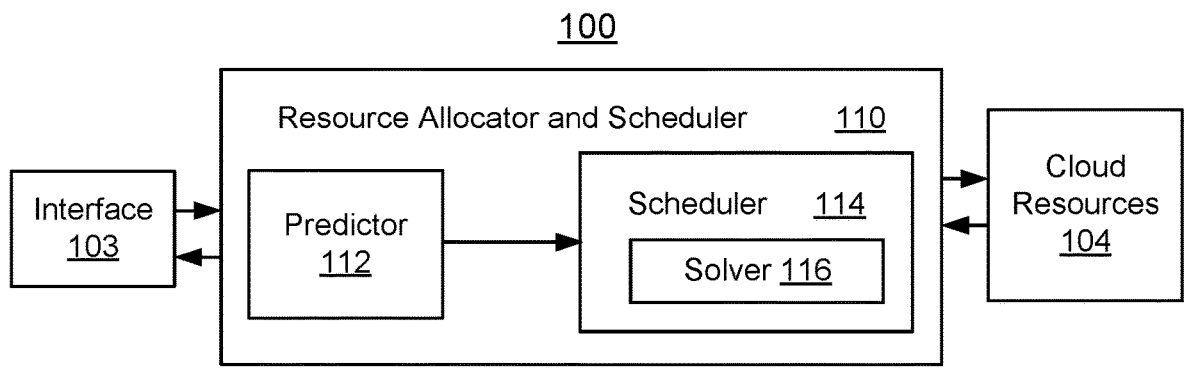

FIGS. 1A-1B depict an embodiment of computing system architecture 100 for performing resource allocation and scheduling. For clarity, not all components are shown. In some embodiments, different and/or additional components may be present. In some embodiments, some components might be omitted. System 100 includes resource allocator and scheduler (RAS) 110, interface 103, and cloud resources 104. RAS 110 can be viewed as including processor(s) and/or control logic (processor) 106 and optimization coprocessor(s) (OC) 108. In some embodiments, RAS 110 may also include memory (not shown). Processor 106 may simply be control logic, an FPGA, a CPU and/or a GPU used in controlling OC 108. In some embodiments, processor(s) 106 might be omitted. Similarly, although a single OC 108 is shown, in some embodiments, RAS 110 may include multiple OCs 108. In some embodiments, OC 108 may be omitted and processor 106 may be used for performing resource allocation and scheduling. RAS 110 may also be viewed as including predictor 112 and scheduler 114. RAS 110 may utilize processor 106 and/or OC 108 to provide predictor 112 and scheduler 114. In some embodiments, predictor 112 may be implemented separately and/or the information provided by predictor 112 received by RAS 110 and, therefore, scheduler 114.

Cloud resources 104 may include one or more servers (or other computing systems) each of which includes multiple cores, memory resources, disk resources, networking resources, schedulers, and/or other computing components used in implementing tasks (e.g., processes performed) for executing workflows (e.g. applications). In some embodiments, for example, cloud resources 104 may include a single server (or other computing system) having multiple cores and associated memory and disk resources. Cloud resources 104 may also include a workflow manager (e.g., AIRFLOW™ in the context of APACHE SPARK™). Interface 103 receives the workflow(s) to be executed and other information from a user and/or cloud resources 104. Workflows include one or more applications each of which includes multiple processes, or tasks, to be performed by cloud resources 104. Examples of workflows include but are not limited to machine learning and production data processing pipelines.

RAS 110 receives workflows (e.g. applications) to be executed on cloud resources 104, for example via interface 103. Information related to the workflows may also be received. This information may include relationships between processes in the workflow. For example, if the output of process A is an input to process B, then part of the information received includes a requirement that process A complete before process B commences (or at least before process B requires the information from process A). The information may include how a user desires to balance cost (which corresponds to the resources used in executing the workflow) and performance (e.g. the desired runtime for the workflow). In some embodiments, the information received may include a maximum total runtime (or maximum makespan), for all processes in the workflow. Information related to cloud resources 104 may also be received by RAS 110. For example, the total capacity of the resources available (e.g. the maximum number of cores that can be dedicated to the workflow), the cost of compute time on the cores, and/or other information may be received by RAS 110.

Based on the workflow and information received relating to the workflow and cloud resources 104, RAS 110 co-optimizes resources allocated to processes and scheduling of processes. In some embodiments, therefore, RAS 110 determines the resources allocated to and order of the processes. In embodiments in which the user indicates a particular balance of cost (resources allocated) and performance (makespan/total runtime for the workflow), RAS 110 co-optimizes resources allocated and scheduling based on this balance. More specifically, predictor 112 determines operating constraints for each process. The operating constraints include the resources used versus the runtime for the process. Based on these operating constraints, scheduler 114 evaluates the possible operating points for each process consistent with the operating constraints and according to a cost function. Scheduler 114 also selects the operating points for each process. The cost function may take into account one or both of the resources that may be allocated to each process and the performance for the workflow (e.g. the total runtime, or makespan). Thus, scheduler 114 determines the resources to be allocated to the processes and schedules the processes.

RAS 110 may improve the efficiency and/or reduce cost of execution of processes for a workflow. For example, RAS 110 may reduce the makespan (total runtime for the processes in the workflow) and/or may reduce resources allocated to the processes of a workflow for a given makespan. Thus, the total runtime and/or power (i.e. resources) consumed may be optimized. Moreover, co-optimization of the resources consumed by and scheduling of each process may result in better performance and resource allocation than separately optimizing one of cost and scheduling and using the optimized values to determine the other. For example, determining the smallest runtimes for the processes, then scheduling the corresponding resources for the smallest runtimes may result in a larger makespan, poor allocation of resources and/or larger costs than desirable. The ability of RAS 110 to find the optimized operating point may also be achieved relatively rapidly even for large scale problems. Thus, RAS 110 may improve efficiency of execution of processes in a workflow.

Figure 2:
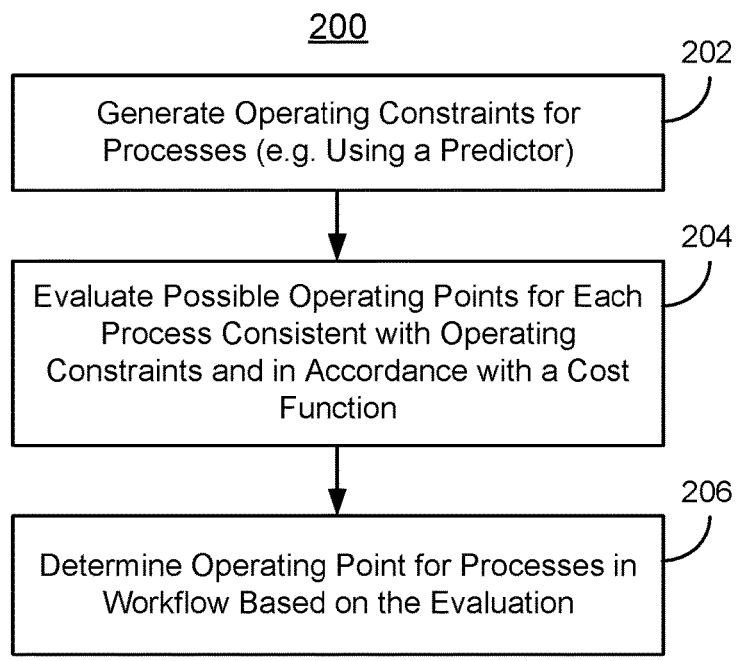
FIG. 2 is a flow-chart depicting an embodiment of a method for automatically allocating resources and performing scheduling in a cloud computing environment.

FIG. 2 is a flow-chart depicting an embodiment of method 200 for automatically allocating resources and performing scheduling. Method 200 may be used in conjunction with system 100. However, in other embodiments, method 200 may be utilized with other systems. Although certain processes are shown in a particular order for method 200, other processes and/or other orders may be utilized in other embodiments.

Operating constraints for the processes in the workflow are generated, at 202. The operating constraint for a process in the workflow includes a runtime for the process versus a portion of available computing resources utilized for the process. The runtime may be predicted based on other information provided, such as prior execution(s) of the process. Thus, the operating constraint for the process may be viewed as a curve indicating the predicted runtime for the process for a particular set of computing resources used.

Possible operating points for each process that are consistent with the operating constraints and accordance to a cost function for the processes are evaluated, at 204. Each possible operating point may include the location of each process in an order of the processes, the makespan (total run time for the processes), the predicted runtime for each of the process, and the computing resources used for executing each of the processes. The operating points evaluated at 204 include those that are consistent with the operating constraints. For example, the runtime predicted for the resources allocated to each process as determined at 202 are used in determining the possible operating points evaluated. Further, the evaluation at 204 is consistent with a cost function. The cost function indicates the resources allocated to the processes in the workflow. The cost function may also include constraints on the total resources available (e.g. the total number of cores allocable to each process in a workflow at each time), user defined limits on the resources used (e.g., a budget/maximum cost for the resources) and/or the desired performance (e.g., the maximum makespan for the processes in the workflow). In some embodiments, the cost function may be a weighted combination of the computing resources utilized for the plurality of processes and the makespan for the plurality of processes. For example, the cost (resources allocated) may contribute more to the cost function (i.e. be more heavily weighted) than the makespan (total runtime for all of the processes). The weights are determined by the user in some embodiments. In some embodiments, RAS 110 or other component such as a workflow manager may provide the weights. In some embodiments, 204 includes searching a space including the possible operating points for each process to determine one or more optimized operating points that are not only consistent with the operating constraints and cost function, but also provides improved performance as measured by the makespan (e.g., a reduced total runtime/makespan) and/or the cost (e.g. reduced cost/reduced amount of computing resources used).

An operating point is determined for each process based on the evaluation, at 206. Thus, the operating point for the workflow is selected based on the cost function and the operating constraints. The operating point selected at 206 may be the operating point(s) which reduce or minimize the cost function while remaining consistent with the operating constraints. The operating point selected at 206 may be the operating point(s) which reduce or minimize the makespan while remaining consistent with the operating constraints. In some embodiments, the operating point selected at 206 may be the operating point(s) which reduce or minimize a combination of the cost and makespan while remaining consistent with the operating constraints. Thus, the optimized operating point(s) are determined and one selected for use. Not only are resources allocated to each process, but the processes scheduled through the selection of the operating point at 206.

For example, predictor 112 may receive the workflow and determine the operating constraints for processes of the workflow at 202. Thus, the runtime for each process versus a portion of available computing resources utilized for the process may be predicted by predictor 112 at 202. At 204, scheduler 114 evaluates possible operating points for each process that are consistent with the operating constraints and accordance to a cost function for the processes are evaluated. Thus, at 204, scheduler 114 may be viewed as co-optimizing cost and runtime. At 206 scheduler 114 selects the appropriate operating point from the operating points that have been evaluated.

Thus, using method 200, the operating point for the workflow is selected based on the cost function and the operating constraints. Method 200 may improve the efficiency of and/or reduce cost of execution of processes for a workflow. For example, method 200 may reduce the makespan and/or may reduce resources allocated to the processes of a workflow for a given makespan. Thus, the total runtime and/or power (i.e. resources) consumed may be optimized. Moreover, co-optimization of the resources consumed by and scheduling for each process may result in better performance and resource allocation than separately optimizing resource configurations and scheduling. Method 200 may not require multiple iterations to determine the operating point. Thus, method 200 may improve efficiency of execution of processes in a workflow in a timely manner.

Figure 3:
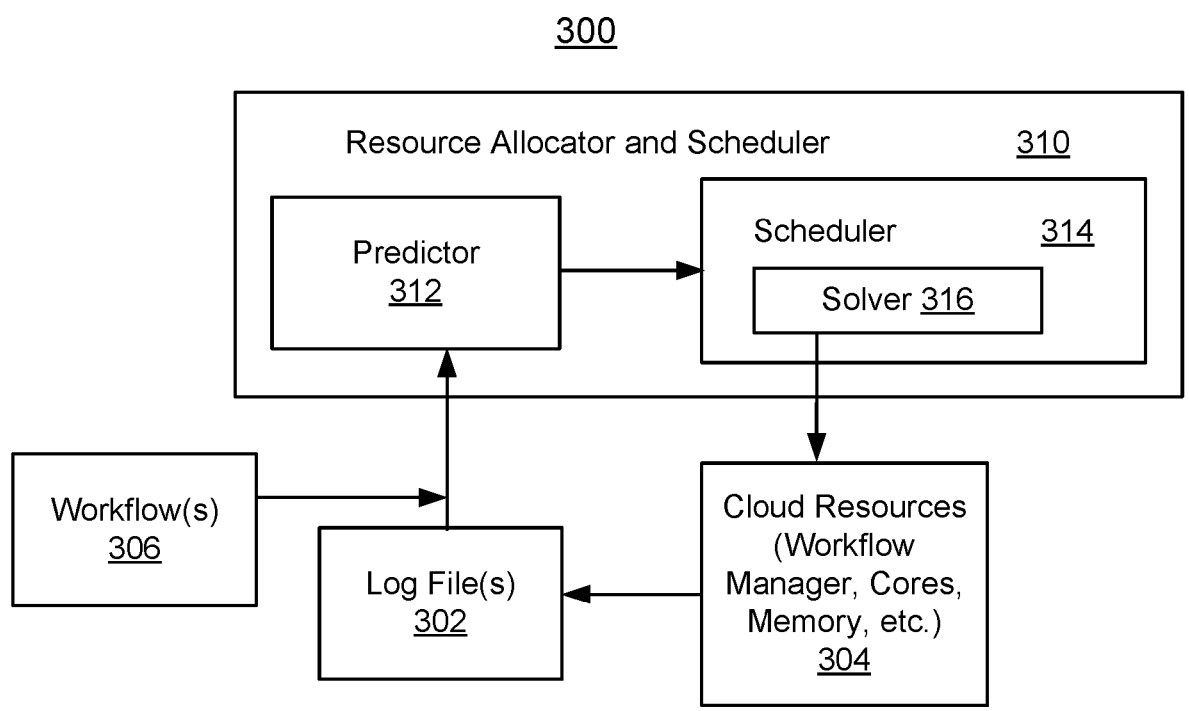
FIG. 3 depicts an embodiment of a computing system architecture for performing resource allocation and scheduling for cloud computing.

FIG. 3 depicts an embodiment of system 300 for performing resource allocation and scheduling for cloud computing. For clarity, not all components are shown. In some embodiments, different and/or additional components may be present. In some embodiments, some components might be omitted. System 300 is analogous to system 100. Analogous components have similar labels. System 300 includes resource allocator and scheduler (RAS) 310 including predictor 312 and scheduler 314 that are analogous to RAS 110, predictor 112, and scheduler 114, respectively. RAS 310 may utilize a processor (not shown) and/or OC (not shown) to provide predictor 312 and/or scheduler 314. In some embodiments, predictor 312 may be implemented separately and/or the information provided by predictor 312 received by RAS 310 and, therefore, scheduler 314. Also shown are cloud resources 304 that are analogous to cloud resources 104. Workflows 306 and log files 302 are also shown.

Workflows 306 may be provided to RAS 310 by a user via an interface (not shown). In some embodiments, workflows 306 are provided in the form of directed acyclic graphs (DAGs). Each DAG may include thousands of diverse processes with complicated dependencies and a variety of durations. DAGs include vertices representing processes and edges representing the data flow between processes. For example, machine learning and production data workflows may be represented b DAGs provided as workflows 306 to RAS 310.

Log file(s) 302 may be generated when the application(s) in workflow 306 are run (e.g. test run or run for a previous workflow) on cloud resources 304. For example, the workflow manager of cloud resources 304 may keep historical logs for processes performed. Log file(s) 302 for such tasks may be stored and provided to predictor 312. Thus, cloud resources 304 may use internal scheduler(s) (not explicitly shown in FIG. 3) to complete the processes within workflow(s) 306 during a test run or during a previous use of cloud resources 304. During execution by cloud resources 304, log file(s) 302 are generated and may be fed back to RAS 310 for use.

In operation, predictor 312 determines the processes in each workflow 306. More specifically, predictor 312 may read the DAG(s) for the workflows 306 and determine the processes, data dependencies, and other features of the DAG(s) for workflows 306. Predictor 312 also utilizes information in logs 302 to determine operating constraints for the processes in DAG(s) of workflows 306. To do so, predictor 312 may study the characteristics of the processes in workflows 306. Using log file(s) 302, predictor 312 forecasts the runtime for each process for each configuration of resources used. In some embodiments, predictor 312 may do so using only one event log 302 per process. Predictor 312 thus determines the runtime versus resources allocated (i.e., an operating constraint) for each process in the DAG. These operating constraints are provided to scheduler 314.

Scheduler 314 determines the resource configuration and schedule for the processes. Scheduler 314 may do so by representing the schedule and resource configuration as a single cost function and optimizing the cost function. Through the cost function, scheduler 314 co-optimizes the resource configurations/utilization and the schedule (e.g., order of processes) for the workflow(s) 306. As such an improvement in cost (resources utilized) and performance (makespan, or total runtime for processes of the workflow(s)) may be achieved. In some embodiments, scheduler 314 does so by evaluating possible operating points consistent with the runtime versus resources allocated determined by predictor 312. In some embodiments, scheduler 314 utilizes solver 316 in order to search the possible operating points. The operating points indicate the resource configuration (e.g. virtual machine instance, the number of virtual machines, and application specific parameters for each process) as well as the order in which to launch processes for the DAGs of workflow(s) 306.

In some embodiments, the cost function which scheduler 312 minimizes may be given by:

$$[(M_{opt}-M)/M]*w+[(C_{opt}-C)/M]*(1-w) \quad \text{(Eq. 1)}$$

Where the minimization is subject to the following operating constraints (Equations (2) through (8)):

$$te_{ij}=ts_{ij}+d_{ijc}, \forall j \in T_i, \forall i \in D \quad \text{(Eq. 2)}$$

$$ts_{ij} \geq te_{ik}, \forall i \in D, \forall (j,i) \in P \quad \text{(Eq. 3)}$$

$$\Sigma_{t=0, \forall j \in Ti}^{N} r_{jtmc} \leq R_m, \forall m \in N, \forall i \in D \quad \text{(Eq. 4)}$$

$$te_{ij} \leq M_{opt}, \forall j \in T_i, \forall i \in D \quad \text{(Eq. 5)}$$

$$C_{opt}=\Sigma_{\forall j \in Ti, \forall i \in D, \forall m \in N} r_{jtmc}*d_{ij}*C_m \quad \text{(Eq. 6)}$$

$$M_{opt} \leq M_{budget} \quad \text{(Eq. 7)}$$

$$C_{opt} \leq C_{budget} \quad \text{(Eq. 8)}$$

And where:
$M_{opt}$=optimal makespan
M=original makespan
$M_{budget}$=makespan budget
C=original cost
$C_{opt}$=optimal cost
$C_{budget}$=cost budget
w=makespan weight
$tS_{ij}$=start time of process j in DAG i
$te_{ij}$=end time of process j in DAG i
$d_{ijc}$=run time of process j in DAG I for configuration c
$r_{jtmc}$=resource demands of process j at time t for resource m for configuration C
$R_m$=total capacity of resource m
$C_m$=cost of resource m
D=set of all DAGs
$T_i$=set of all processes in DAG i
P=set of all precedence constraints
N=set of all resources
F=Flip probabilities Equation 1 defines the optimization objective, where the improvement in makespan and cost are minimized according to a tunable weight parameter w. The weight parameter indicates how important the makespan (i.e., total runtime/ performance) is relative to cost (which relates to the cloud computing resources utilized). For example, the user could set w=0.5 to achieve a balanced optimization between runtime and cost; w=0 to optimize for the lowest cost and w=1 to achieve the shortest runtime. In some embodiments, users can configure w between 0 and 1 to allow for a flexible optimization preference. Equation 2 defines the process start and end times with the predicted runtime with different configurations. The classic RCPSP has been relaxed to allow for the runtime to be malleable. This is a change of the RCPSP formulation to allow RAS 310 to provide co-optimization of resource configurations (e.g., cost) and scheduling. Equation 3 defines the precedence constraints given by the DAGs where a process may only start when the precedent task finishes, allowing RAS 310 to be DAG-aware. Equation 4 defines the resource constraints to ensure that the sum of demands of scheduled tasks do not exceed the capacity of the cluster. Here, a resource can be any cluster capacity constraint, including number of cores, memory, or bandwidth. The optimal makespan is defined by Equation 5, where the end time of each task is less than the optimal makespan. The optimal cost is indicated by Equation 6. Equations 7 and 8 ensure that the makespan and/or cost are within user-defined budgets. The makespan and cost budget can be optimally set by the user. If either are not set, they are set with a default value of infinity in some embodiments.

In some embodiments, optimization of the cost function may be formulated as a resource-constrained project scheduling problem (RCPSP). RCPSP includes scheduling processes with given resource demands, durations, and precedence constraints on a set of resources with given capacity limits. The RCPSP formulation accurately captures the flexibility of constraints as well as the integrated nature of the assignment and scheduling problem. For example, processes are allowed to execute on any number of resources. The RCPSP representation also allows scheduler 312 not to have to decompose the problem into two sub-problems (e.g. assign, then sequence). Therefore, scheduler 312 need not make decisions about which machine each process has to run on prematurely prior to optimization, resulting in better solutions. As opposed to classic formulations of RCPSP where demands and runtimes for each task are given and fixed, RAS 310 allows the resource demands and task runtimes to be variables to allow the solver to optimize the resource configurations and schedules jointly. Solver 316 may be used to search a space of operating points in order to optimize the cost function. For example, in some embodiments, solver 316 may be a satisfiability (SAT) solver.

In some embodiments, solver 316 may use simulated annealing in conjunction with being a SAT solver. Simulated annealing mimics the physical process of heating material then slowly lowering the temperature to decrease defects, resulting in a minimum energy state. Similar to other greedy algorithms, a new point is accepted if it results in a lower objective, but it may also avoid getting trapped in local minimum by accepting points that result in a higher objective at a decreasing probability. For RAS 310, simulated annealing may be used to optimize for the resource configurations given the results of the schedule optimization, while SAT solver 316 optimizes the schedule given specific resource configurations for each application.

In some embodiments, the following may be used in operating solver 316.

Method 1

```
while not stopping criterion do
    c ←get_new_configuration(c)
    Mnew,Cnew ←SAT _Solver (c, d, P, R) ◁ optimal
    ΔE ←calculate_delta_energy(Mnew,Cnew)
    if ΔE < 0 then
        F ← 1
    else
        F ←exp(-ΔE/T )
    end if
    if F > acceptanceprobability then
        save_configurations ( )
        Mopt = Mnew
        Copt = Cnew
    end if
end while
```

Method 1 shows the detailed steps of RAS 310 in some embodiments. In each iteration, a new set of resource configurations c is chosen for a set of tasks. Solver 316 then minimizes the objective for the current set of resource configurations with a corresponding new optimal makespan Mnew and cost Cnew. Here, the optimization problem is solved to the global optimal solution. The new set of configurations and schedules are accepted based on acceptance probabilities and flip probabilities (F) dependent on the energy difference (ΔE) between the current best solution and the new solution. If the energy difference is negative (e.g. new solution has a better objective than the current best solution), then the new solution is accepted. Otherwise, the new solution is accepted if the probability is greater than a randomly generated acceptance probability, allowing the search to escape from local minima. The search continues until a stopping criterion (e.g., time limit or convergence). This allows the search of operating points to be stopped when there are diminishing returns. Each component of solver 316 may depend on the other to reach an optimal solution. Together, they jointly optimize for both the schedule and resource configurations. The time complexity of simulated annealing algorithms may heavily depend on the cooling schedule, which determines the number of iterations required. Because the objective is defined as a sum of the percentage of improvements in cost and runtime, a constant starting annealing temperature of 1 may be defined for all problem sizes. The cooling rate is defined as a function of n. A fixed convergence criteria is also defined, resulting in a time complexity of the simulated annealing algorithm of O(n). Within each iteration of the simulated annealing iteration, SAT solver 316 may be used. While the worst case time complexity of SAT solvers is exponential, such solver can efficiently solve problems with tens of millions of variables and constraints with techniques like conflict-driven clause learning. In addition, lazy clause generation helps keep the SAT problem sizes small. By carefully selecting and designing solver 316, system 300 may reach optimal solution with minimal overhead.

RAS 310 may improve the efficiency and/or reduce cost of execution of processes for a workflow by co-optimization of resources used and scheduling. RAS 310 may do so through the cost function and limitations imposed by operating constraints. For example, RAS 310 may reduce the makespan and/or may reduce resources allocated to the processes of a workflow for a given makespan. Thus, the total runtime and/or power (i.e. resources) consumed may be optimized. Moreover, co-optimization of the resources consumed by and scheduling of each process may result in better performance and resource allocation than separately optimizing one of cost and performance and using the optimized values to determine the other. For example, determining the smallest runtimes for the processes, then scheduling using the corresponding resources for the smallest runtimes may result in a larger makespan, poor allocation of resources and/or larger costs than desirable. Thus, RAS 310 may provide an optimized global solution to allocation of cloud resources and performance. Consequently, RAS 310 may improve efficiency of execution of processes in a workflow.

Figure 4:
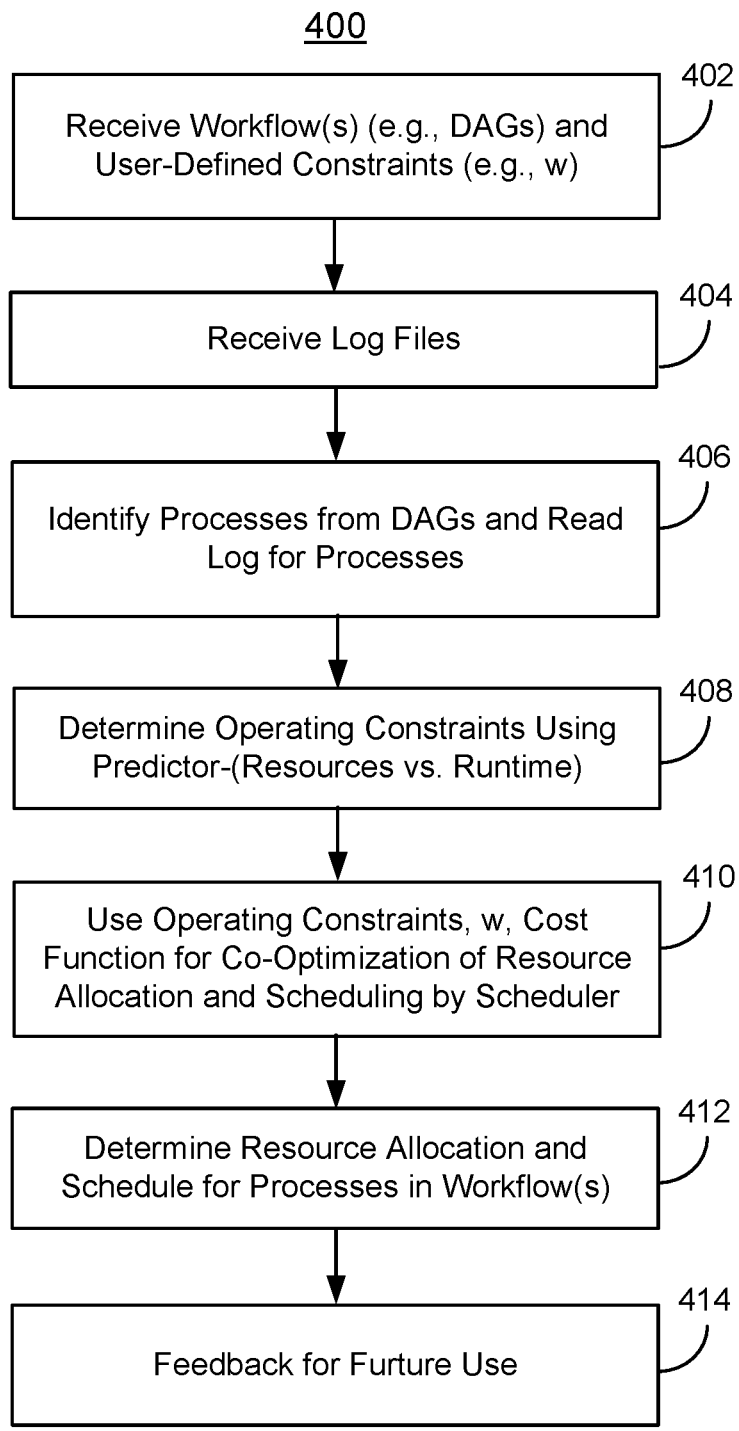
FIG. 4 is a flow-chart depicting an embodiment of a method for automatically allocating resources and performing scheduling in a cloud computing environment.

FIG. 4 is a flow-chart depicting an embodiment of method 400 for automatically allocating resources and performing scheduling in a cloud computing environment. Method 400 may be used in conjunction with system 300. However, in other embodiments, method 400 may be utilized with other systems. Although certain processes are shown in a particular order for method 400, other processes and/or other orders may be utilized in other embodiments.

Workflow(s) are received by the RAS, at 402. In some embodiments, the workflow(s) take the form of DAGs. In addition, other information may be provided by the user. For example, the weight for the cost and/or performance, maximum makespan, and/or other constraints may be provided.

The log files may also be received by the RAS, at 404. The log files may be provided by the cloud resources. In some embodiments, a user may provide log files for the processes in the workflow(s).

Information for providing operating constraints is extracted, at 406. Thus the processes in the DAGs may be identified. Further, the information regarding these processes is obtained from the log files.

Operating constraints for the processes in the workflow are generated, at 408. The operating constraint for a process in the workflow includes a runtime for the process versus a portion of available computing resources utilized for the process.

Using the operating constraints determined at 408 and a cost function (e.g. Equation 1), resource allocation and scheduling may be optimized, at 410. In some embodiments, 410 includes evaluating possible operating points (resources and order of processes) for each process that are consistent with the operating constraints and in accordance with the cost function. Each possible operating point may include the location of each process in an order of the processes, the makespan (total run time for the processes), the predicted runtime for each of the process, and the computing resources used for executing each of the processes. The cost function may also include constraints on the total resources available (e.g. the total number of cores allocable to each process in a workflow at each time), user defined limits on the resources used (e.g., a budget/maximum cost for the resources) and/or the desired performance (e.g., the maximum makespan for the processes in the workflow). In some embodiments, the cost function may be a weighted combination of the computing resources utilized for the plurality of processes and the makespan for the plurality of processes. In some embodiments, 410 includes searching a space (e.g. using a SAT solver) including the possible operating points for each process to determine one or more optimized operating points that are not only consistent with the operating constraints and cost function, but also provides improved performance as measured by the makespan (e.g., a reduced total runtime/makespan) and/or the cost (e.g. reduced cost/reduced amount of computing resources used).

An operating point is determined for each process based on the evaluation. Consequently, the resources are allocated and the processes scheduled using the result of the evaluation at 410, via 412. Thus, the operating point for the workflow is selected based on the cost function and the operating constraints.

Figure 5:
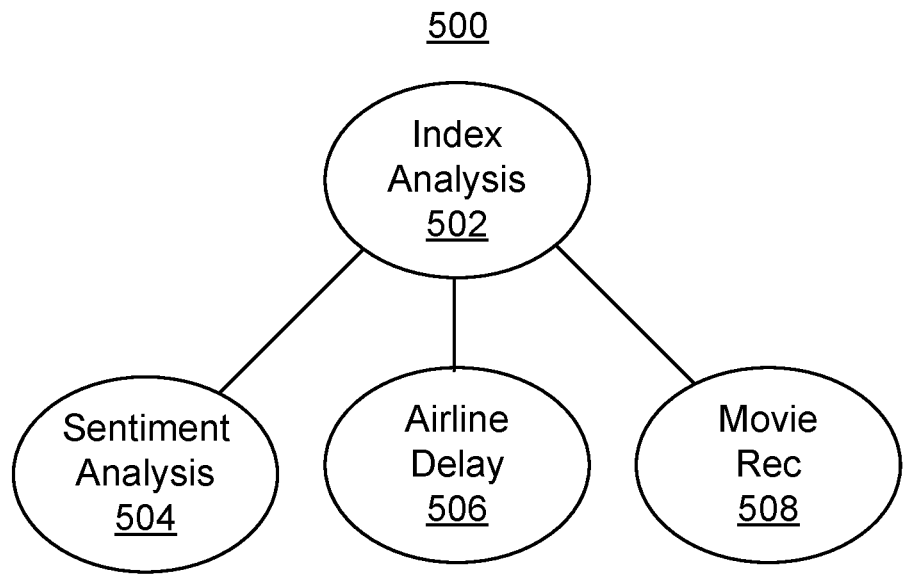
FIG. 5 depicts an embodiment of a workflow for which resources are desired to be allocated and processes are desired to be scheduled.

For example, predictor 312 may receive the workflow(s) 306 in the form of DAGs, at 402. FIG. 5 depicts the DAGs 502, 504, 506, and 508 in a fairly simply workflow 500. At 404, log files are received. The processes to be scheduled and for which resources are to be allocated are identified from the DAGs 502, 504, 506, and 508, at 406. Also at 406, log files 302 are read.

Figure 6:
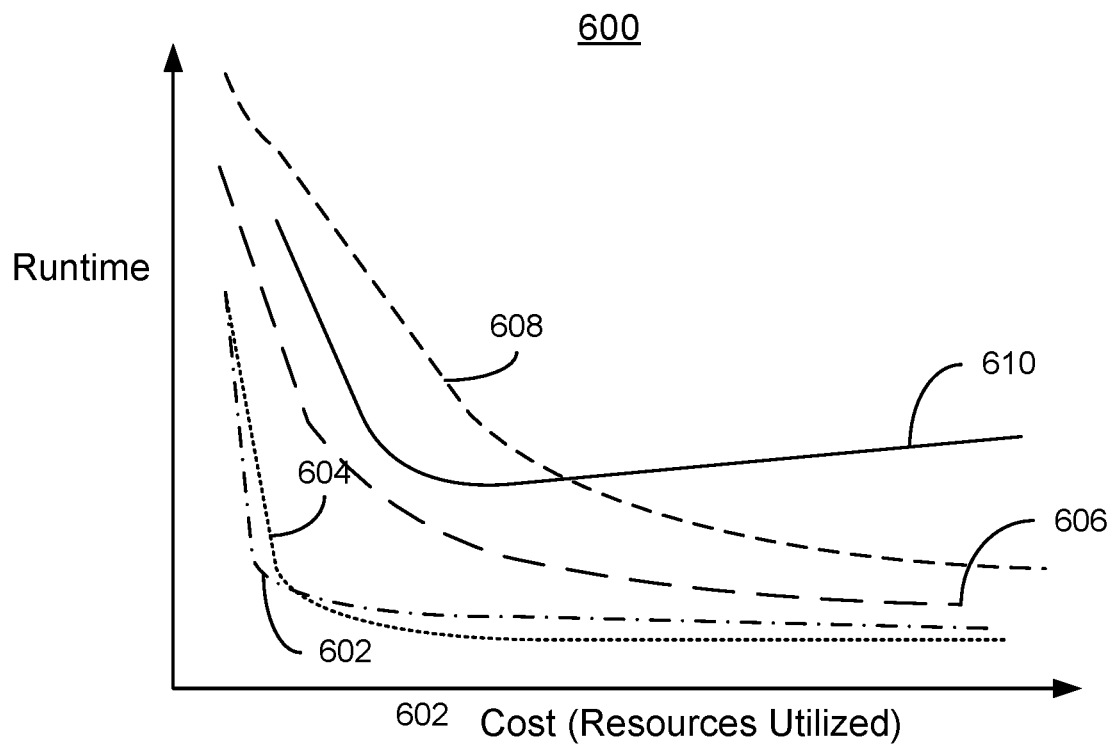
FIG. 6 depicts a graphical representation of operating constraints determined for a method for automatically allocating resources.

The operating constraints for the processes in the workflow are determined by predictor 312, at 408. Thus, runtime versus resources allocated is predicted for the processes. FIG. 6 depicts a graph 600 of embodiments of operating constraints 602, 604, 606, 608, and 610 determined at 408. Graph 600 is for explanatory purposes only and not intended to represent a particular workflow. Thus, as can be seen in FIG. 6, resources allocated may vary widely.

Figure 7:
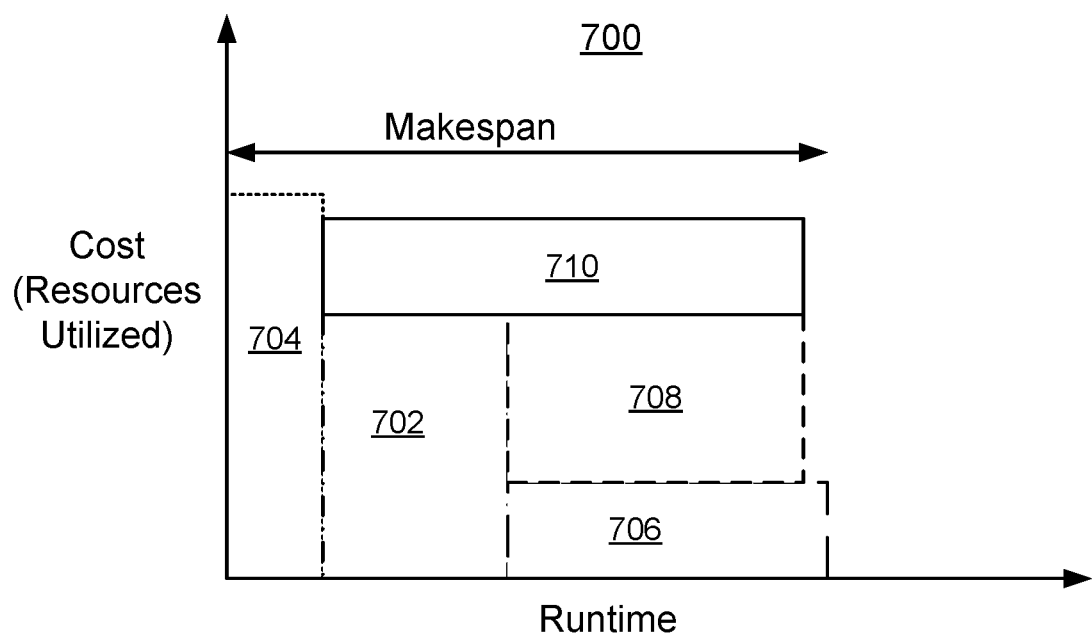
FIG. 7 depicts a graphical representation of an embodiment of the operating point for a workflow.

The cost function is optimized subject to the operating constraints by scheduler 314 (e.g. solver 316) to determine the operating point for the workflow, at 410. The schedule and resource allocation are determined by the optimization, at 412. For example, FIG. 7 is a graph 700 depicts processes 702, 704, 706, 708, and 710 corresponding to operating constraints 602, 604, 606, 608, and 610, respectively. Graph 700 is for explanatory purposes only and not intended to represent a particular workflow. Because scheduling and resource allocation have been co-optimized, graph 700 indicates tight packing of processes 702, 704, 706, 708, and 710 in the cost-runtime space. The makespan and cost may thus be at or near a global minimum (i.e., are globally optimized). Feedback in the form of logs for any processes executed may be provided, at 414.

Thus, using method 400, the operating point for the workflow is selected based on the cost function and the operating constraints. Method 400 and system 300 may improve the efficiency of and/or reduce cost of execution of processes for a workflow. Improved performance may thus be achieved.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A method of efficiently executing a plurality of processes, comprising:
generating, using a predictor, a plurality of operating constraints for the plurality of processes, an operating constraint of the plurality of operating constraints being for each process of the plurality of processes;
evaluating a plurality of possible operating points for each process consistent with the plurality of operating constraints and according to a cost function for the plurality of processes, the cost function including a user-weighted combination of computing resources utilized for the plurality of processes and a makespan for the plurality of processes; and
determining an operating point for each process based on the evaluating, the operating point including an order of each process of the plurality of processes;
wherein the plurality of processes are executed on the computing resources using the operating point including the order for each process of the plurality of processes.

2. The method of claim 1, wherein the operating constraint for a process includes a runtime for the process versus a portion of available computing resources utilized for the process.

3. The method of claim 2, wherein the operating point for the process includes a particular runtime and particular computing resources used for the runtime consistent with the operating constraint for the process.

4. The method of claim 1, wherein the operating point for each process determines an order of the plurality of processes, an optimized makespan, and an optimized computing resources used for executing the plurality of processes.

5. The method of claim 1, wherein the evaluating further includes:
searching a space including the plurality of possible operating points for each process.

6. The method of claim 1, wherein the generating the plurality of operating constraints further includes:
reading at least one log file corresponding to at least one of the plurality of processes; and
generating the plurality of operating constraints based on the at least one log file.

7. A system for efficiently executing a plurality of processes, comprising:
a processor configured to:
generate, using a predictor, a plurality of operating constraints for the plurality of processes, an operating constraint of the plurality of operating constraints being for each process of the plurality of processes;
evaluate a plurality of possible operating points for each process consistent with the plurality of operating constraints and according to a cost function for the plurality of processes, the cost function including a user-weighted combination of computing resources utilized for the plurality of processes and a makespan for the plurality of processes; and
determine an operating point for each process based on the evaluation, the operating point including an order of each process of the plurality of processes, the plurality of processes being executed on the computing resources using the operating point including the order for each process of the plurality of processes; and
a memory coupled to the processor and configured to provide the processor with instructions.

8. The system of claim 7, wherein the operating constraint for a process includes a runtime for the process versus a portion of available computing resources utilized for the process.

9. The system of claim 8, wherein the operating point for the process includes a particular runtime and particular computing resources used for the runtime consistent with the operating constraint for the process.

10. The system of claim 7, wherein to evaluate, the processor is further configured to:
search a space including the plurality of possible operating points for each process.

11. A computer program product embodied in a non-transitory computer readable medium and comprising computer instructions for efficiently executing a plurality of processes, comprising instructions for:
generating, using a predictor, a plurality of operating constraints for the plurality of processes, an operating constraint of the plurality of operating constraints being for each process of the plurality of processes;
evaluating a plurality of possible operating points for each process consistent with the plurality of operating constraints and according to a cost function for the plurality of processes, the cost function including a user-weighted combination of computing resources utilized for the plurality of processes and a makespan for the plurality of processes; and determining an operating point for each process based on the evaluating, the operating point including an order of each process of the plurality of processes, the plurality of processes being executed on the computing resources using the operating point including the order for each process of the plurality of processes.

12. The computer program product of claim 11, wherein the operating constraint for a process includes a runtime for the process versus a portion of available computing resources utilized for the process.

13. The computer program product of claim 11, wherein the cost function includes a user-weighted combination of the computing resources utilized for the plurality of processes and a makespan for the plurality of processes.

* * * * *